US009450876B1

(12) United States Patent
Marr

(10) Patent No.: US 9,450,876 B1
(45) Date of Patent: Sep. 20, 2016

(54) WEAR LEVELING AND MANAGEMENT IN AN ELECTRONIC ENVIRONMENT

(71) Applicant: Amazon Technologies, Inc., Reno, NV (US)

(72) Inventor: Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 131 days.

(21) Appl. No.: 13/799,333

(22) Filed: Mar. 13, 2013

(51) Int. Cl.
*H04L 12/803* (2013.01)
*G06F 15/173* (2006.01)
*G06F 13/00* (2006.01)
*G06F 12/02* (2006.01)

(52) U.S. Cl.
CPC ......... H04L 47/125 (2013.01); *G06F 12/0246* (2013.01)

(58) Field of Classification Search
CPC ............. G06F 12/0246; G06F 3/0616; G11C 13/0002; H04L 47/125
USPC .......... 709/224, 223, 226; 711/103; 365/148
See application file for complete search history.

(56) References Cited

U.S. PATENT DOCUMENTS

| 7,596,618 | B2 * | 9/2009 | Basu et al. ................... 709/226 |
| 7,721,157 | B2 * | 5/2010 | Spitz et al. ................. 714/47.2 |
| 8,085,586 | B2 * | 12/2011 | Golov et al. ............. 365/185.03 |
| 8,171,385 | B1 * | 5/2012 | Tormasov ..................... 714/805 |
| 8,601,313 | B1 * | 12/2013 | Horn ............................. 714/6.32 |
| 2008/0082657 | A1 * | 4/2008 | Hart et al. ..................... 709/224 |
| 2009/0204852 | A1 * | 8/2009 | Diggs et al. ..................... 714/42 |
| 2009/0216649 | A1 * | 8/2009 | Hubbard ......................... 705/14 |
| 2010/0325340 | A1 * | 12/2010 | Feldman ............ G06F 12/0246 711/103 |
| 2013/0179631 | A1 * | 7/2013 | Cepulis ......................... 711/103 |
| 2013/0346676 | A1 * | 12/2013 | Kim .............................. 711/103 |
| 2014/0033212 | A1 * | 1/2014 | Balasubramaniam et al. ............................. 718/102 |
| 2014/0241032 | A1 * | 8/2014 | Patapoutian et al. ......... 365/148 |

* cited by examiner

*Primary Examiner* — David Lazaro
*Assistant Examiner* — Zi Ye
(74) *Attorney, Agent, or Firm* — Hogan Lovells US LLP

(57) ABSTRACT

Workloads can be intelligently placed across a group of resources in order to attempt to balance or otherwise manage the level of wear among various components of those resources. Devices such as solid state drives or other NAND-type devices can have a limited number of operations that can be performed before those devices become unreliable, such that it can be desirable to monitor the wear level of each of these devices. As it can be easier to manage resources with similar wear levels for large groups of resources, it can be desirable to attempt to level the relative amount of wear among at least groups of these resources. Attempts can be made to level across a fleet or resources, within pools of resources, and/or within the resources themselves, such as where a server includes multiple devices with potentially different wear levels, such as multiple NAND-type devices.

25 Claims, 7 Drawing Sheets

WEAR LEVELING AND MANAGEMENT IN AN ELECTRONIC ENVIRONMENT

BACKGROUND

As an increasing number of applications and services are being made available over networks such as the Internet, an increasing number of content, application, and/or service providers are turning to technologies such as resource sharing or "cloud computing." Cloud computing, in general, is an approach to providing access to electronic resources through services, such as Web services, where the hardware and/or software used to support those services is dynamically scalable to meet the needs of the services at any given time. A user or customer can obtain access to various services through the cloud, or across at least one network, and thus does not have to purchase and maintain the hardware associated with the services.

In order to spread the workloads of various customers across a set of resources, approaches such as load balancing are used to direct certain portions of the workloads to different resources, or sets of resources. These workloads can vary significantly in size and type, however, such that certain workloads can require significantly more resource capacity than others. If certain customers are associated with certain resources, and those customers have very resource intensive workloads, the resources associated with those customers might perform many more operations than other resources associated with other customers. While this might not be significant for certain types of resources, other types of resources such as NAND flash memory will wear out after a certain amount of usage. Significant variations in the distributions in workload thus can cause some of these resources to wear out before others, which can cause difficulties in the maintenance of a set of resources and the processing of customer workloads.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing resources and/or customer workloads connections in an electronic environment. In particular, various embodiments can monitor the relative wear of a set of resources, and attempt to intelligently place workloads based at least in part upon the relative wear of those resources. In some embodiments, a monitoring component can determine the average wear of non-volatile memory, having a finite number of read-write cycles and thus a limited lifetime, for each host machine, and can attempt to place workloads to balance the average wear level across a set of host machines. In some embodiments, the hosts can be grouped by wear level, such that hosts of similar age or use levels can be balanced against each other, rather than against different generations of hosts. Grouping hosts by age and/or wear level also provides for easier management of a fleet or set of hosts. If the wear level of a particular host changes drastically with respect to the other hosts in a group, that host can be switched to another logical group with a similar wear level. The wear level can also be examined with respect to the age of a host or resource, to ensure that newer resources are not overloaded due to their relatively low wear level, as well as to ensure that alarms are not generated when a new host is added and the variation in wear level across the set of hosts exceeds an otherwise unacceptable amount of wear variation.

Similarly, approaches in accordance with various embodiments can monitor memory devices with limited lifetimes (e.g., solid state drives or other NAND-type devices) within a host machine or other such resource as well. A host receiving a workload can attempt to place that workload on memory devices based on wear level, such as to minimize wear on any particular device, balance wear, or maximize wear on a targeted device, among other such options. Similarly, the age of each memory device can be considered such that replacing a device does not generate an alarm when the variation in wear level exceeds a determined threshold. The age of various memory devices, hosts, or other such components can also be used to calculate a wear rate of each component as well, such that the rate of wear can be balanced and/or alarms can be generated when one or more components exceed a determined wear rate threshold.

Various other applications, processes, and uses are presented below with respect to the various embodiments.

Figure 1:
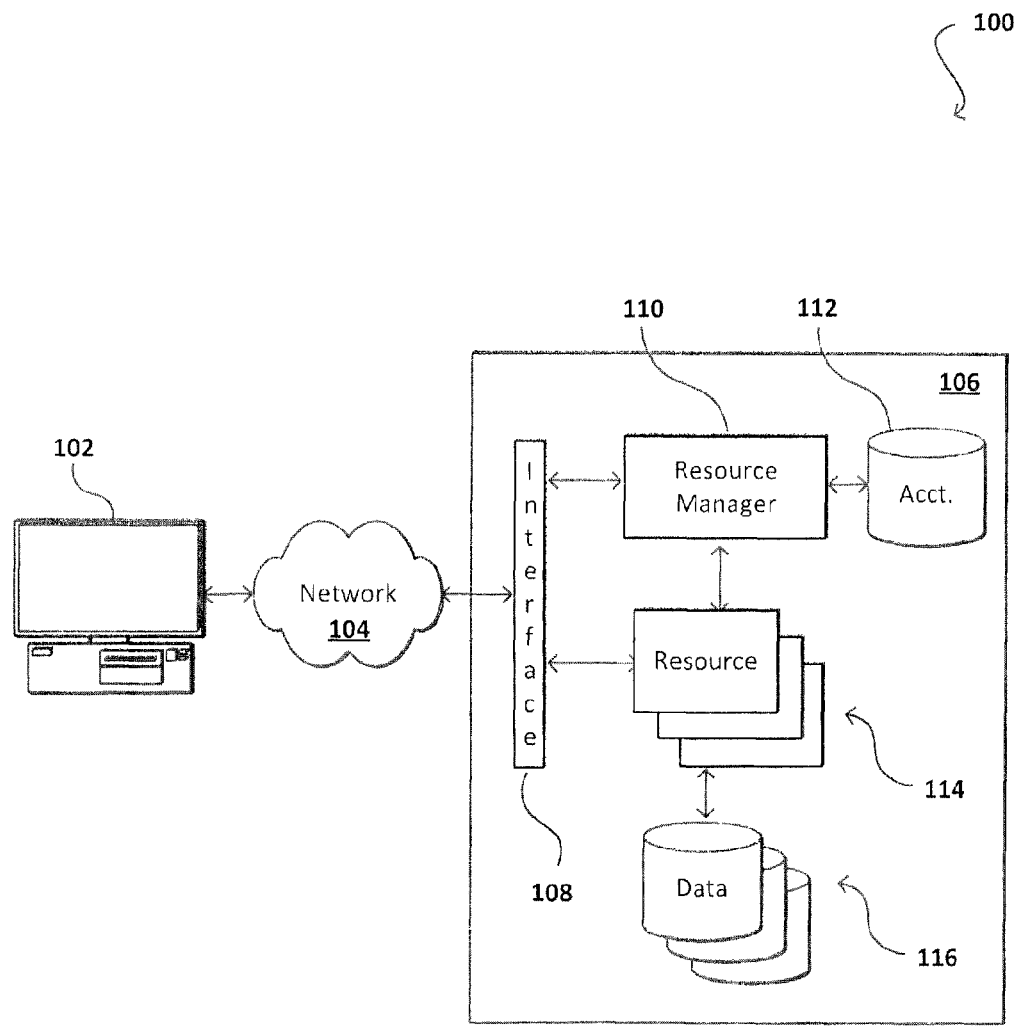
FIG. 1 illustrates an example environment in which various aspects can be implemented.

FIG. 1 illustrates an example environment 100 in which aspects of the various embodiments can be implemented. In this example a user is able to utilize a client device 102 to communicate across at least one network 104 with a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, an application executing on the client device 102 that needs to access or utilize a portion of the resources 114, which might be exposed as one or more services to which the application has subscribed, can submit a request that is received to an interface layer 108 of the provider environment 106. The interface layer can include application programming interfaces (APIs) or other exposed interfaces enabling a user to submit requests, such as Web service requests, to the provider environment. The interface layer 108 in this example can also include other components as well, such as at least one Web server, routing components, load balancers, and the like. When a request to access a resource is received at the interface layer 108 in some embodiments, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In various embodiments, the resources 114 can take the form of servers (e.g., application servers or data servers) and/or components installed in those servers. In some embodiments at least a portion of the resources can be "virtual" resources supported by these and/or components. In certain embodiments, some of the components used to support customer services comprise devices that are known to "wear" or degrade over time. For example, a server might include one or more memory devices, such as a Solid State Drive (SSD), flash memory, or other NAND-type device. A NAND device in general is a type of non-volatile storage that does not require power to retain data. NAND devices are relatively inexpensive compared to other types of memory, such as NOR devices, and thus are desirable to use to reduce the cost of providing the resources. Due to the design of these NAND devices, however, the devices have a finite number of read-write cycles before the individually erasable segments become unreliable. The "wear" on these devices can be tracked and/or reported, such as by monitoring the number of reads and writes and comparing this to a reported number of read-write cycles for the lifetime of the NAND device. Other values can be determined and/or tracked as well, such as the percentage of remaining cycles, the percentage of utilized cycles, the number of used or remaining cycles, etc. It should be understood that while the present discussion will utilize the term wear, similar values such as remaining lifetime, number of cycles utilized, anticipated capacity, or other such values could be utilized as well within the scope of the various embodiments. Further, other devices with known or anticipated wear patterns or trends can be utilized as well within the scope of the various embodiments.

In addition to the fact that the devices wear out and may need to occasionally be replaced, a further complication arises in the fact that the devices can wear differentially based at least in part upon the differences in reads and writes requested to be performed by each of the devices. In a shared resource, multi-tenant, or "cloud" environment, for example, multiple customers might use a set of NAND devices, and the workload for the customers might be distributed across the devices using a load balancing algorithm or other such process, which can distributed based upon factors such as the recency of a workload sent to a device, the number of concurrent connections to a device, the number of workloads being currently processed by each device, or other such information. It will often be the case, however, that different requests will correspond to workloads of different sizes. Further, different customers will utilize the devices by different amounts, such that assigning two different devices to two different customers might result in one NAND device having significantly more wear than the other device. Such an approach thus requires a resource manager or other such entity, service, or component to monitor the wear and/or usage of each of these devices and notify when a device is at or near its lifetime, such that it can be taken out of service and replaced.

In many instances, it can be easier to manage a fleet of servers or other set of devices that are expected to wear out at approximately the same time, rather than having to monitor and replace each device individually at different times. Further, the devices that wear out most quickly can generally be the most used devices, such that they can be the least desirable to frequently have to take off line.

Figure 2:
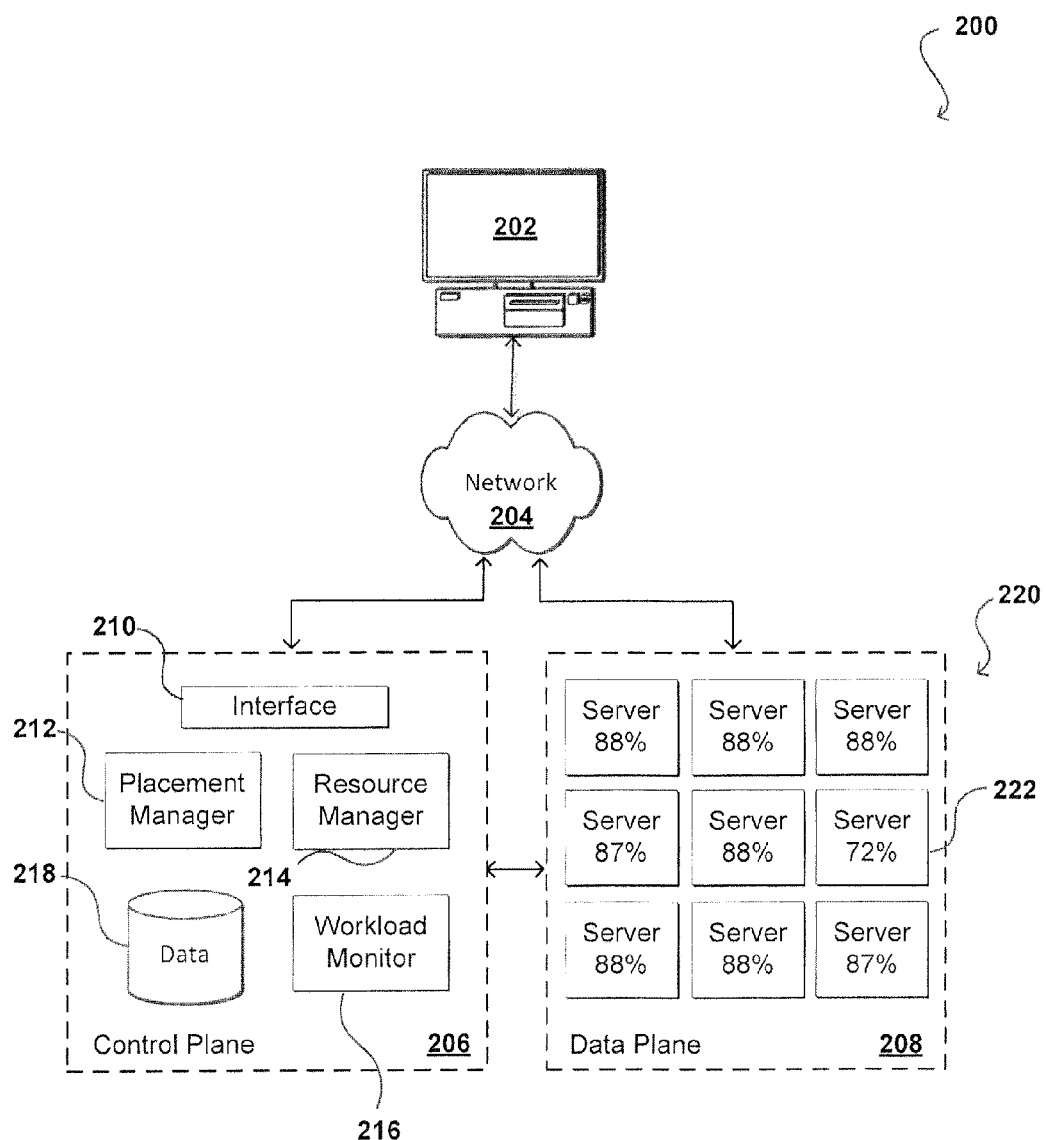
FIG. 2 illustrates an example implementation in which customer workloads can be distributed across a group of computing resources in accordance with the various embodiments.

Accordingly, systems and methods in accordance with various embodiments can attempt to balance or level the wear across a set of devices, such as a fleet of servers including NAND memory devices. As an example, FIG. 2 illustrates an example configuration 200 wherein multiple servers 220 are provided in a data plane 208, or data environment, of a resource provider. The servers 220 in the data plane 208 can be managed by one or more components of a control plane 206, or control environment, which are physically and/or logically separated from the servers 220 and other components of the data plane 208. In this example, each server 220 can have one or more host managers or other components that can communicate with a resource manager 214 or workload monitor 216 to provide wear information for the server. In some embodiments a server can provide wear information for each device on, or in communication with, that server, or can provide an average wear value for the devices on the server, such as an average wear value for the solid state drives contained in the server. In this way, a component such as the resource manager 214 can track the relative wear levels of each of the servers 220, and can provide that information to a component such as a placement manager 212. The placement manager can be a system, service, component, or module, for example, that determines which server is to receive a workload for an incoming request.

For example, a request might be received (over at least one network 204) from a client device 202 for a customer, where that request includes an amount of work, or a workload, to be performed by one (or more) of the servers 220. The placement manager can look at the relative wear levels of the servers 220 available to accept the request, and can make the determination as to where to place the workload based at least in part upon the wear levels of the available servers. In one embodiment, the placement manager 212 can decide to direct the workload to the server with the highest remaining percentage of cycles (or lowest wear level, etc.). In other embodiments, the placement manager might analyze the wear levels to determine the server(s) with more than a threshold higher wear level than the other servers, and might remove that server from consideration for placement of the workload. In FIG. 2, one of the servers 222 has undergone excessive usage and has a significantly lower remaining percentage of cycles than the other servers. The placement manager then might remove this server 222 from consideration, and use the regular placement algorithm to determine which of the other servers should receive the workload. Such usage can help to level the wear across the set of servers 220, rather than let certain servers 222 undergo more usage and develop hot spots within the server fleet.

As discussed, however, certain customers and workloads can utilize the resources much more than others. Thus, determining where to place workloads based primarily upon factors such as relative wear levels can still result in at least some discrepancy in wear level across the fleet of servers 220. Accordingly, approaches in accordance with various embodiments can utilize a service, component, or module such as a workload monitor 216 to monitor usage by certain customers, applications, services, or entities, for example, as well as the amount of usage for certain types of requests or workloads. The workload monitor 216 then can attempt to determine patterns in usage or otherwise predict the usage needed for a received workload.

For example, the workload manager might receive information for a request received from a first customer. The workload manager might analyze data stored in a local data store 218 or other such location to attempt to predict the number of cycles, amount of I/O activity, or other such measure of usage, that will be needed to process the request based upon past usage by that customer. This can include, for example, an analysis of data for a number of previous requests, a lookup of an average number of cycles, or another such value. The placement manager might determine that the workload will require very few cycles, and thus might direct the workload to the server 222 with the highest level of wear, such that the server can still be utilized while attempting to balance wear levels. Similarly, if the placement manager determines that the workload will likely require a large number of cycles, the placement manager might direct that workload to one of the servers with the lowest wear levels.

In some embodiments, a component such as a resource manager 214 can make one or more API calls or similar requires to an agent running on each of the servers 220. Each agent can be configured to periodically poll the SSDs, flash memory, or other NAND-type devices on the respective server and, through a SMART mechanism or similar process as discussed herein, can receive information for the current wear level of each device. As each device manufacturer might report different information regarding wear, a process can be utilized to attempt to normalize the wear levels of the various devices to a single concept of wear, remaining life, etc.

Information other than wear levels can be considered in a placement decision as well. For example, two servers might have approximately the same average wear levels, but one server might be significantly older than the other. In some embodiments, the placement manager might decide to direct the workload to the older server, as that server will likely need to be replaced or repaired before the newer server. Similarly, if the newer server has the same level of wear as the older server then the newer server has been processing a much higher workload over a recent period of time, and it can be desirable to even out the workloads for other purposes, such as to minimize a likelihood of server failure due to prolonged operation at full capacity, etc.

Figure 3:
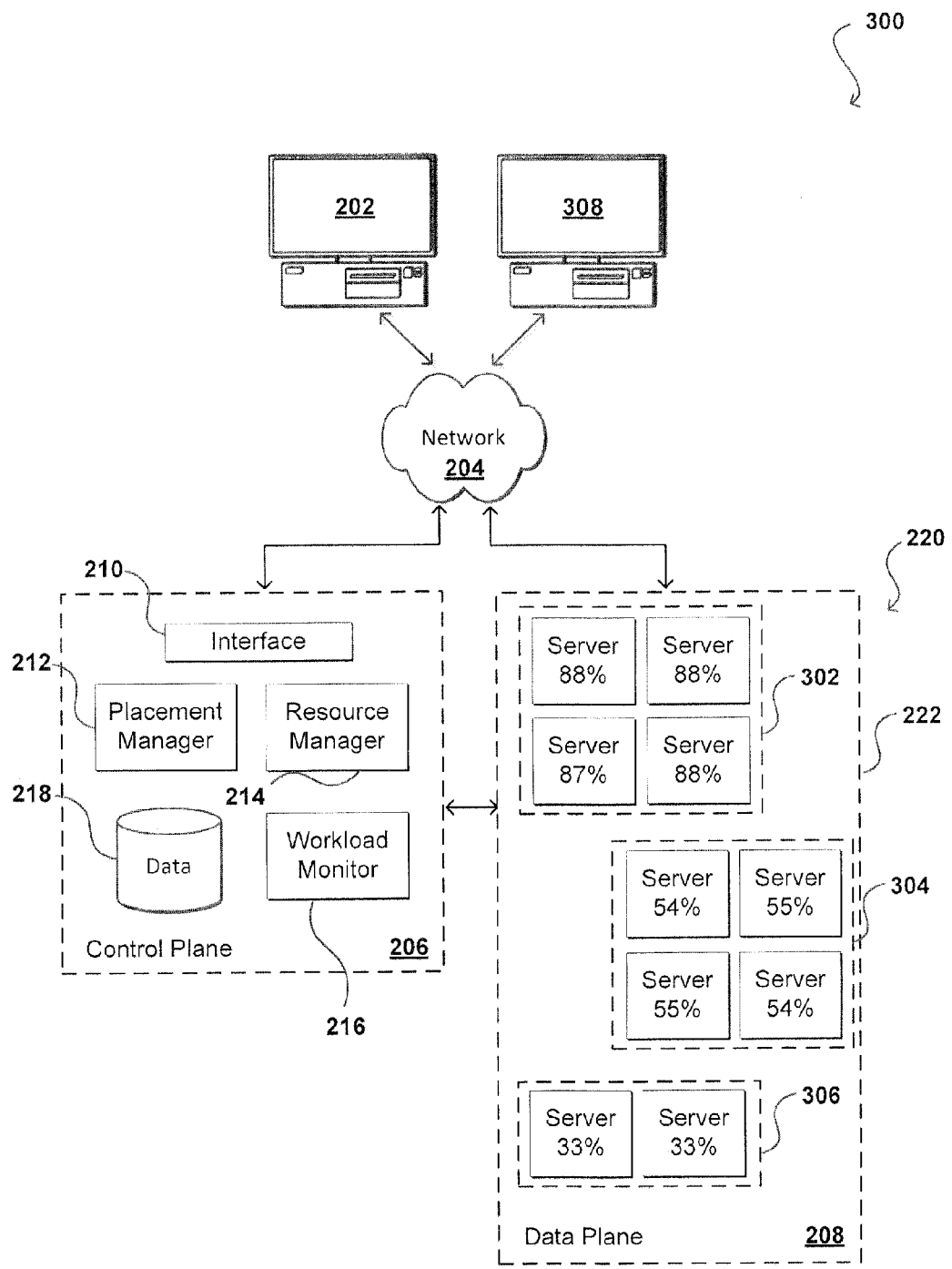
FIG. 3 illustrates an example implementation in which customer workloads can be distributed across pools of computing resources in accordance with the various embodiments.

As discussed, factors such as the age of a server might be used in placement decisions, as it can be undesirable in at least some situations to send the majority of workloads to a recently added group of servers, simply because those servers have the least amount of wear. In FIG. 3, the servers are grouped (physically, geographically, and/or logically) into pools 302, 304, 306 of servers, where each pool has approximately the same age (or other similar characteristics). As illustrated, a newest pool 302 has around 88% of its cycles remaining, while the older pools 304, 306 have averages of around 55% and 33%, respectively. Separating the servers into pools enables wear leveling within the pools, such that groups of servers can have similar wear levels and can be managed accordingly. Thus, if the resource provider is planning to retire the servers in the oldest pool 306, the placement manager can direct the heaviest workloads to that pool while still balancing within the pool such that the NAND components will approach the end of their useful lifetime at approximately the same time. Pooling also enables other types of decisions to be made, such as the amount of usage that newer or older pools should receive, which types of customers or requests to place on each type of device, etc. Such an approach also provides for easier management of servers of different ages or generations, as servers are typically not added one at a time but in groups, and such an approach can allow for wear leveling within each of those groups of servers. Such approaches enable each pool to be managed as a unit having an average wear level, etc.

In some embodiments, the placement decisions can be made to attempt to reduce the number of pools. In this example there are only three pools with significantly different wear levels. In data centers with thousands of servers, for example, there might be dozens of pools where some of the pools might only vary by a few percent with respect to average wear. In at least some embodiments, the placement manager might attempt to place workloads in order to merge pools as their wear levels converge, in order to cause there to be fewer distinct servers to manage. Placement decisions might also be made to move servers to different pools. For example, a server might have a significantly taxing workload to process, which can cause the server to have significantly more wear than the other servers in its pool. If the wear level of that server is then closer to the wear level of another pool, the resource manager 214 (or another such component) can decide to move that server into the other pool, instead of working to attempt to balance the other servers within the original pool.

In addition to attempting to level the wear of servers across a pool, fleet, or other such grouping, it also can be desirable to provide a way to provide a notification or alarm when any of a set of wear-related issues arise. For example, SSDs can provide information such as SMART attributes that provide information about the wear of the drive. If the wear level of a particular component reaches a minimum threshold or other such value, a notification might be generated to a fleet manager or other such entity indicating that the drive will need to be replaced and/or removed from operation in the near future. Further, if certain components or devices are being utilized at more than a threshold rate, or the rate of wear is faster than expected, a notification can be generated.

In at least some embodiments, a component such as a resource manager can monitor the relative wear levels of servers, either across a fleet, in a pool, or otherwise, and can generate a notification when the difference in wear values between servers meets or exceeds a maximum difference. For example, going back to FIG. 2 the system might monitor the relative wear (or other such value) on the various servers 220. As illustrated, one of the servers has a 72% remaining cycle value, while the other servers are around 88%. If a threshold differential of 5% or 10% is set, for example, the system can generate an alert and/or notification that something unusual is happening, someone might be abusing the system, or at least that the system is being used in a way that was not intended.

As discussed, in some embodiments a component such as a workload monitor 216 might monitor customer workloads for use in predicting future workload sizes and/or properties. During this monitoring, the workload monitor might also attempt to determine if the actual needs of a current workload exceed or otherwise differ from expectations. For example, if a customer typically submits small workloads so a workload for that customer was assigned to a server with a high wear level, but the actual workload being processed exceeds the expected amount by at least a determined or threshold amount, the system can generate a notification. The notification can be sent to a user or entity, or can be sent to a component or service such as a placement manager 212. In at least some embodiments, the placement manager 212 can determine that a workload is significantly larger than expected, and can determine to move the remaining portion of that workload to a different server. In some embodiments, the workload might not have to be significantly different than expected, but if another workload is moved or the system starts falling outside an acceptable equilibrium state, for example, the placement manager might decide to move workloads to other servers within a fleet, the same pool, a different pool, etc.

In some embodiments various other actions might be taken when a workload is much larger or more resource intensive than expected. For example, a notification of excessive usage can trigger a throttling of a customer or customer workload, or even a customer behavior. In other embodiments, changes might be made to the resources themselves, such as to the operating parameters or firmware, among other such options. In some embodiments, a user who occasionally submits excessive workloads can have a first type of action performed, such as to shift the workload to different resources, while prolonged or repeated submission might result in other actions, such as throttling or additional costs as may be set forth in the terms of the customer account, etc.

Figure 4:
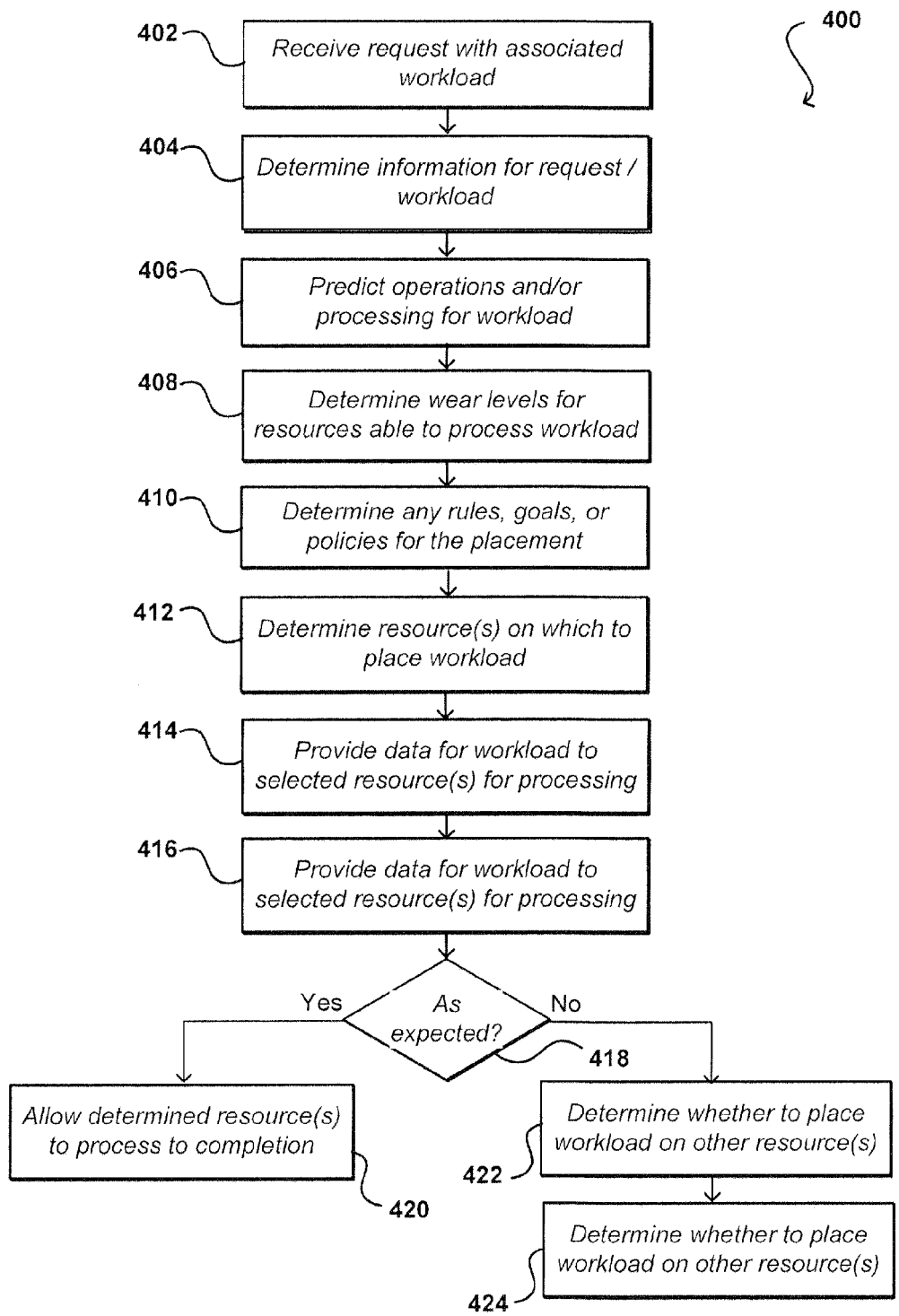
FIG. 4 illustrates an example process for distributing customer workloads that can be utilized in accordance with various embodiments.

FIG. 4 illustrates an example process 400 for managing placement of workloads across a set of resources that can be utilized in accordance with various embodiments. It should be understood that there can be additional, fewer, or alternative steps performed in similar or alternative orders, or in parallel, within the scope of the various embodiments unless otherwise stated. In this example, a request is received 402 to a resource environment, where that request includes a workload to be processed using one or more resources of the environment. A component such as a placement manager can determine 404 information about the request, such as the type of request and a customer associated with the request. A component also can attempt to predict 406, based at least in part upon an amount of processing or operations utilized for similar types of workloads and/or workloads for that customer, the amount of processing and/or number of operations that will be needed to process the workload. A component can determine 408, either directly or through a component such as a resource manager, a wear level for each of a set of resources capable of processing the request. These resources can include, for example, application servers, data servers, storage devices, and the like. At least some of these devices will include components that are known to wear out over time or otherwise have a limited lifetime, such as may include solid state devices, flash memory, or other NAND-type devices. The placement manager can determine 410 any goals, rules, or policies for the placement, such as to minimize differences in wear across the fleet, direct operation-intensive workloads to older servers approaching retirement, attempt to maintain average wear levels of various pools, etc. The placement manager can utilize a placement algorithm or other such process to determine 412 which of the resource(s) should receive the workload for the request, in order to satisfy any of the determined goals, rules, or policies for the placement. Data for the workload can be then provided 414 to the determined resource(s) for processing. The processing of the workload by the resource(s) can be monitored 416 by a component such as a workload monitor. If it is determined 418 that the workload is behaving as expected, such as where the workload requires around the anticipated number of resource operations or less, the workload monitor can allow 420 the workload to process to completion using the determined resource(s), unless some other event occurs that would prevent the completion. If the workload is not behaving as expected, such as where a significantly higher number of operations will be required to process the workload, another determination can be made 422 to determine whether to move the workload to another resource based at least in part upon the actual workload behavior, and the determined resource(s) can be used 424 to process the remaining portion of the workload.

In some embodiments, each resource (e.g., application server or data server) itself might include multiple individual resources, such as multiple solid state drives or NAND devices. For example, an application server might include eight or sixteen SSDs, for processing customer workloads, as well as potentially other flash memory or BIOS devices. Each of these devices can have a wear level as well, such that it can be desirable in at least some embodiments to manage the wear levels of the individual devices within a server or other such resource as well.

Figure 5:
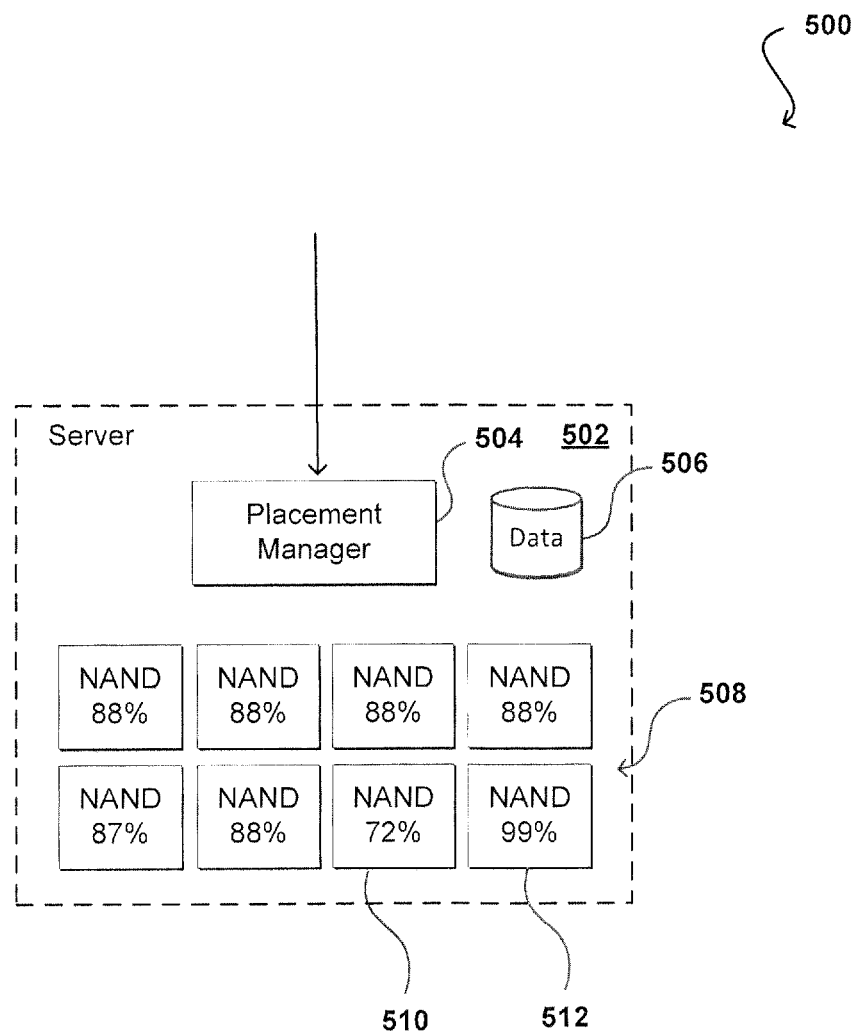
FIG. 5 illustrates an example implementation in which customer workloads can be distributed across NAND devices within a computing resource in accordance with the various embodiments.

FIG. 5 illustrates an example configuration 500 of a multi-tenant resource that can be utilized in accordance with various embodiments. In this example, a server 502 includes a set of NAND devices 508, at least a portion of which can be used to process customer workloads. The server also includes a placement manager 504, or other such component or process, configured to perform operations similar to at least some of the operations discussed above with respect to FIGS. 2 through 4, except that in this situation the placement manager 504 manages placement of workload on the NAND devices 508 within the server. Although a relatively small number of components are shown in the figure for simplicity of explanation, it should be understood that the server can include other components as well as discussed elsewhere herein and/or as known for server components, as may include one or more processors, memory, I/O devices, and the like. When the server 504 receives a workload, such as may be directed from a fleet level placement manager as discussed above, the placement manager 504 for the device can analyze information for the device, such as the type of workload and customer information as discussed above, as well as any information provided about the predicted requirements, as may have been determined by a fleet level, pool level, or other such placement manager. The placement manager 504 can use a placement algorithm or process to analyze information about the wear levels across the NAND devices 508 in the server, as well as data about past workload requirements or other data stored in a local data store 506, for example, to determine which of the NAND devices is to process at least a portion of the workload. For example, the device might determine to remove one of the devices 510 from consideration where that device has a relatively low remaining lifetime, or relatively high wear level. Similarly, the device might decide to direct the workload to a NAND device 512 with the highest remaining lifetime, or lowest level of wear, or might decide to remove that device 512 from consideration if that device is new and has had a relatively high amount of usage over a recent period of time, as discussed elsewhere herein. Various other such placement decisions can be made as well as discussed elsewhere herein. Further, the placement manager 504 and/or another such component of the server 502 can determine to move the workload among different devices 508 if the workload is different from expected, or as wear levels of the devices vary while processing other workloads, among other such options.

Such an approach enables more accurate wear leveling, as the fleet or pool level determinations can be made based upon factors such as the average wear level of a resource, but that resource might include multiple NAND devices or similar components that can have significantly different wear levels if not monitored and/or attempted to be leveled. Even though a server might report that it has about a year's worth of wear left on it at current usage, one of the individual devices in that server might be about ready to expire. Approaches discussed herein enable workloads to be placed and/or moved within a server or resource as well, in order to balance wear across the components of that server (or target specific devices for usage, etc., as discussed elsewhere herein). In some embodiments, the leveling within a server can be used to determine to move workloads between servers. For example, a criterion such as a wear deviation within a server being met or exceeded might cause a workload to be shifted to a different server. Various other placement determinations can be made as well within the scope of the various embodiments.

In some embodiments, there can be a level of abstraction provided to customers, such as where a virtualization layer is provided that enables the customer to interact with a "virtual" resource, which is actually a type and/or address of resource that the provider of the resources can map to any or a number of different resources in a way that is transparent to the customer. In this way, the resource provider can place workloads as appropriate and/or beneficial, without the customer having to do anything or have any knowledge of the placement. A customer will not be granted native or full access to an SSD. A virtual machine manager (VMM) such as a hypervisor component can manage a set of virtual machines that are abstractions of the underlying drives, providing block I/O virtualization. The VMM can manage the I/Os and, when a particular VMM indicates that it wants to write to an SSD, a component can determine where to place that I/O. In some embodiments, an approach such as RAID 0 can be used to group drives together to form a virtual logical unit number (LUN), and the drives of the LUN can be exposed as a single, larger drive. For example, a server with eight SSDs might report that it has two drives of larger capacity, where each "drive" is a set of four drives in a LUN. When a request or I/O is received to one of the virtual drives, or LUNs, an algorithm can be used with a LUN mapping to determine which of the physical drives should receive the request. The wear level of each of the physical devices can be monitored, and the mappings or placements can be updated to attempt to obtain wear leveling or other wear patterning across the set of devices. In at least some embodiments, the remapping can be performed dynamically where the customer actions can be monitored and remapping performed at runtime, etc.

Certain embodiments can analyze the status of various SSDs or other such drives or devices in a machine, such as a host machine or server, and route work to those drives based at least in part upon the relative wear of the drives. It is possible, however, that one or more of the drives might be replaced with a new drive, such as when one of the existing drives fail. The new drive that is added typically will have no wear, such that an allowable range of wear differences across the drives on the device might be exceeded. This excessive variation in wear can result in an alarm or notification being generated when excessive wear differential is a trigger for one or more alarms. Alternatively, the a host manager or other such component might route an excessive amount of work to the new drive due to the low level of wear, which might significantly reduce the lifetime of the new drive. Thus, approaches in accordance with various embodiments can also take into account information such as the relative age of each drive. In some embodiments, the system might utilize one or more functions (linear, exponential, or otherwise) that attempt to model an average rate of wear, or range of wear values, such that a determination can be made as to whether the amount wear for a given drive falls within an expected range for its age or length of use. In this way, the system can attempt to level wear across the devices over time. When determining whether to place a workload on a device, then, the system can attempt to predict the amount of work needed and can place the workload on a device based at least in part upon whether the workload will cause the device to fall outside the allowable and/or expected wear range for its age. It might be observed that devices such as a type of NAND device wear faster or slower over time for the same load, such that a wear model or function can be generated and used to determine whether the amount of wear on a device is acceptable for its age.

It can be at least somewhat challenging, however, to programmatically distinguish "alarming" wear patterns versus similarly measured differences on drives that are the result of a different age and/or generation of drive(s) in the server. Drives are naturally divided by server, but the drive usage can also be controlled at a sub-server level by, for example, assigning drives by virtual machine and steering workloads of different types or sizes to specific drives to help regulate the wear rate. Thus, alarming can be performed at a virtual machine grouping level or other partitioning level, rather than only at the server level.

In at least some embodiments, the wear or lifetime remaining on a drive can be regularly sampled and/or monitored over the history of the drive. This can include, for example, sampling the number of NAND program-erase cycles left on the average drive. Such information not only provides an absolute sense of remaining lifetime, but can also be analyzed to determine the rate at which a drive is being worn, or the first order derivative, as well as fluctuations in the rate of wear on the drive, which can indicate bursts of usage or the second order derivative, etc. As mentioned, however, it may not be straightforward to determine the wear or lifetime metric for various drives or devices, as different manufacturers provide different metrics to quantify this information. Different ways of characterizing similar information may include the number of bytes written to the drive, the average number of bytes written to the drive, the average number of program-erase cycles for NAND cells, the number of bytes or program erase cycles that can be reliably executed in the future, etc. With additional information such as the total number of NAND cells or bytes storable, the size of erase and program blocks, the write amplification, the amount of spare area, and other related drive characteristics, the provided data can be analyzed and converted into a common metric across all drive manufacturers, types of drives, etc.

At least some embodiments utilize a common metric that can be used to calculate the expected lifetime of a drive based at least in part upon a reference model for high-load burn rate. The use of the metric an require information such as the expected write amplification at the provisioning depth, average mix of block sizes, etc., including assumptions needed to make a conservative baseline by server and/or platform type. Alarming on wear outliers within a server can account for information such as the age and/or generation of the drives. In one embodiment, drives can be grouped by a value such as the computed lifetime remaining. Each grouping can have a maximum amount of variation in remaining lifetime, such as no more than about 4%, from the least to most worn device within the group. As an example, a drive with 600 days of remaining lifetime could be considered in the same group as one with 624 days or one with 576 days, but drives with 576 and 624 days could not be in the same group with each other since their relative "span" is 8% total.

Various approaches or statistical techniques can be used to compute these groupings from a population. One technique is to assume all drives will be in the same wear group and determine whether the drives are all within 4% of each other. If not, the drives can be sorted by the amount of remaining wear and an attempt can be made to remove the least worn drive from the group statistics. A computation then can be performed to determine the mean wear and variance across the population of remaining drives. The process can be repeated to determine the most and/or least worn drive, as well as the drive that, upon removal, would result in the lowest variance among the remaining drives. That drive then can be removed from that group. The process can be repeated for remaining drives until the drives are within the allowable span. The process can be repeated for other groups as well, until each group has at most the allowable span. In the worst case, each drive might be in its own group, depending upon the number of drives, but this can be a special, rare case. It can be more common that the result will include a most worn group, which might include a set of original drives, as well as more less worn drive groups each with a smaller number of drives, as may have been replacements due to drive failure or other such events.

Occasionally a large number of drives in a small number of servers might fail. It then might be the case that all but a few drives in each server need to be replaced. If replaced naively, the result would be a small group of drives that now are the "most worn," but do not necessarily represent an abuse scenario. Such an occurrence can in some approaches generate an alarm, even though the alarm might not be warranted. Such an occurrence can be relatively unlikely, as mass failure of devices, when it does occur, typically happens during server "burn-in," or soon after entering production. In this case, the drives should exhibit very little wear. If it happens after the drives have been worn, a policy can be utilized that indicates that for drives already having, for example, more than 2% wear, if more than 15% (or another appropriate number) of devices have failed in the lifetime of the server, all of the drives in the server should be replaced with drives of comparable wear lifetime. The functional drives that have been removed can be binned into groups of comparable wear lifetime and used in other servers during replacement, in an effort to minimize the number of wear groups on a given server to one or two at most, for example.

If the most worn group (or groups) has less than half the drives, this can represent an outlier regardless of drive age, such that one or more remediation steps can be appropriate. Oftentimes such an occurrence would be the result of an abuse scenario where a drive or small subset of drives is somehow targeted for more wear than other drives. It may also happen because of virtualization configuration or other software related mistakes in the service layer, resulting in an excessive amount of I/O being directed to a subset of the drives. In any case, these situations can be addressed through configuration settings or customer management (e.g., tagging the customer as an abuser and removing them), among other such options. Such a situation also can require attention to address the alarming condition, such as by replacing the smaller set of drives (either the more or less worn population, whichever is smaller) with drives of comparable wear to the majority of drives. If drives of comparable wear do not exist, all the drives can be replaced with drives of comparable wear, such as all new drives with no wear. In a least some embodiments, a whitelist can be created that can include entries for systems that alarmed in situations such as those presented above. For systems that were whitelisted, the wear can be monitored over time to determine whether the differential is worse than a larger threshold, and not raise another alarm until the second threshold is exceeded.

The "most worn" group can represent the assumed lifetime of the server from an alarming perspective, such that any alarms related to the overall "server lifetime" around NAND is based on the most worn drives. Alarms then can be generated as the amount of life left on the server approaches "0% life left," or another such value. These drives can also be "avoided" if there is any server level control over steering I/O workloads (e.g., via mapping of logical to physical drives), where there is an apparent bias that can be addressed. This can include, for example, VM placement or other gross segregation/assignment of SSDs by a customer, AMI, or workload, etc.

In certain embodiments, wear rates or other first order derivatives can be computed for use with another set of alarms, where those alarms are triggered when certain drives or servers are being worn out at a higher than expected rate. As an example, if any given drive is getting worn out faster than 1% per week, an alarm might be generated even if the "wear span" is not outside the allowable range (e.g., 4%) across the server. This can help to quickly detect abuse or bug scenarios before the server has become operationally impacted by the differential in wear. The wear rate computation may also be used to inform placement decisions by workload or other such aspects.

Figure 6:
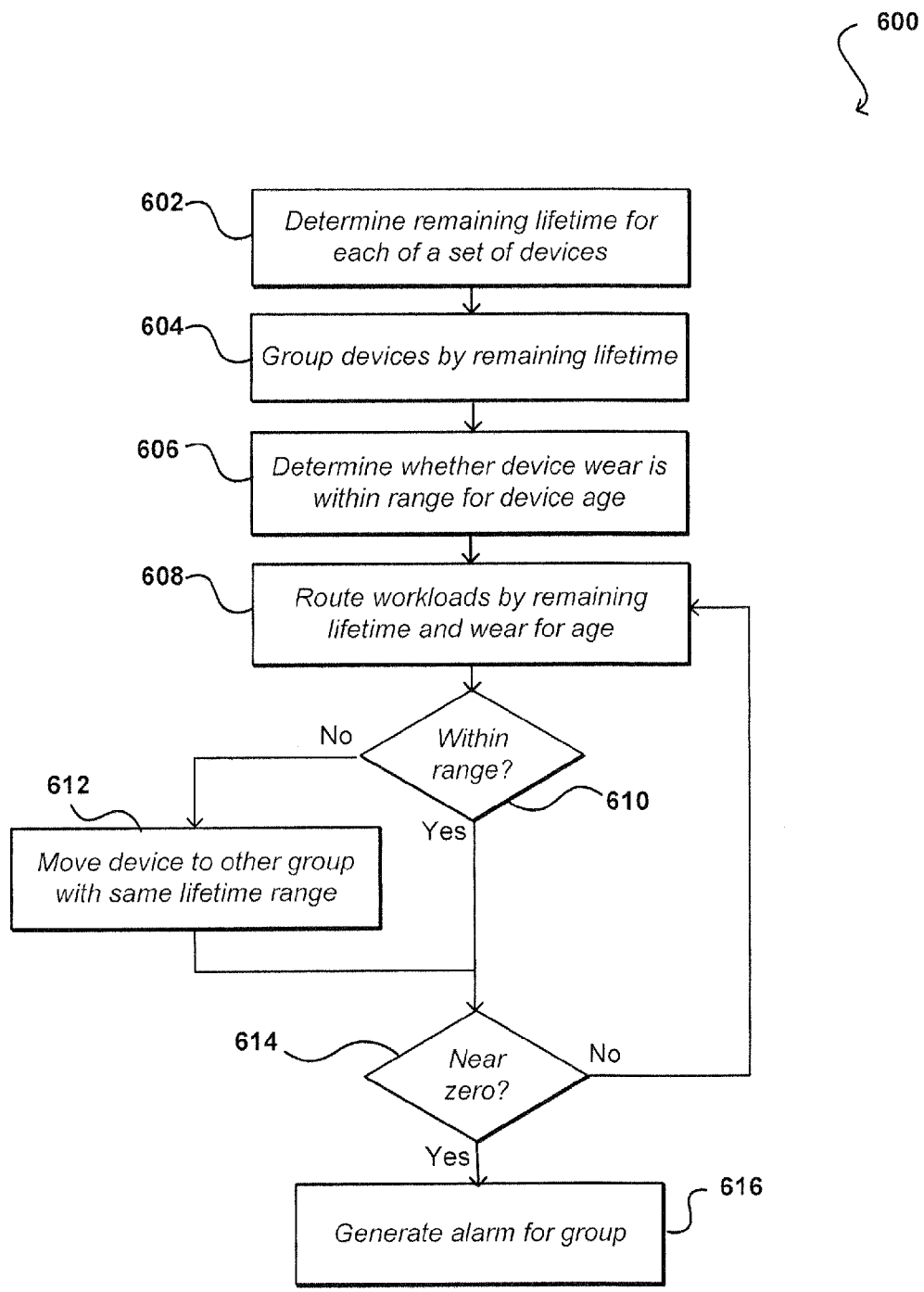
FIG. 6 illustrates an example process for distributing customer workloads that can be utilized in accordance with various embodiments.

FIG. 6 illustrates an example process 600 for managing wear across a group of devices that can be utilized in accordance with various embodiments. In this example, the remaining lifetime of each of a set of devices is determined 602. The devices can be grouped 604 by amount of remaining lifetime, such as where each group varies only up to about 4% in remaining lifetime. For each device, a determination can also be made 606 as to whether the wear level on the device is within an acceptable range for the age of the device. Workloads to be processed then can be routed 608 to devices based at least in part upon the remaining wear and the amount of wear for the age of the device. The wear of the devices can be monitored over time, and a determination made 610 as to whether the remaining lifetime a device is still within the desired range of its current wear group. If not, the device can be moved 612 to another logical group where the remaining lifetime of the device falls within the range of the group. The groups can be monitored to determine 614 whether the remaining lifetime is approaching zero. If not, the process can continue. If so, an alarm can be generated 616 indicating that the devices in the group will need to be replaced or otherwise addressed.

Figure 7:
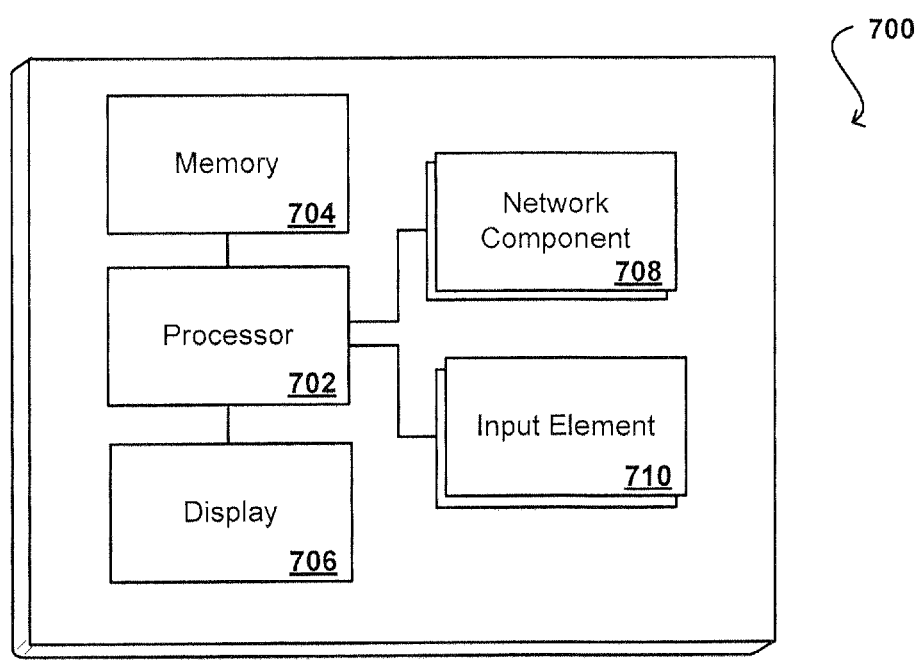
FIG. 7 illustrates example components of a client device that can be utilized in accordance with various embodiments.

FIG. 7 illustrates a logical arrangement of a set of general components of an example computing device 700 that can be utilized in accordance with various embodiments. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), or set of LEDs, among other such. In some embodiments, the computing device 700 of FIG. 7 can include one or more communication elements 708, such as a Wi-Fi, Bluetooth, RF, wired, or wireless communication system. The device in many embodiments can communicate with a network, such as the Internet or an intranet, and may be able to communicate with other such devices. In some embodiments the device can include at least one additional input device 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of distributing workloads, comprising:
   receiving a request to process a workload using at least one of a plurality of host machines operating in a multi-tenant environment;
   analyzing at least one of information for the request or information for a source of the request to determine an expected amount of wear resulting from processing the workload, wherein the wear corresponds to a reduction of available read-write cycles in a memory device;
   analyzing each of at least a portion of the plurality of host machines to determine an average wear level of one or more memory devices installed in the host machine, the average wear level for the one or more memory devices determined by analyzing information provided by the one or more memory devices installed in the host machine, each of the one or more memory devices having a finite number of read-write cycles;
   balancing the average wear levels of the one or more memory devices across at least the analyzed host machines based at least in part upon the average wear level of each of one or more memory devices installed in the analyzed host machines and the expected amount of wear resulting from processing the workload;
   selecting a host machine based at least in part on the balancing and factors associated with the workload of the one or more memory devices;
   sending information to process the workload in the request to the selected host machine of the analyzed host machines;
   analyzing the processing of the workload;
   determining that the actual wear resulting from the processing of the workload exceeds the expected amount of wear by at least a determined threshold amount; and
   moving at least a portion of the workload to a second host machine of the analyzed host machines based at least in part upon the determination that the actual wear resulting from the processing of the workload exceeds the expected amount of wear by at least the determined threshold amount, wherein the second host machine is selected based at least in part on the balancing and factors associated with the portion of the workload.

2. The computer-implemented method of claim 1, further comprising:
   allocating each of the plurality of host machines into one of a plurality of host groups, each host group comprising host machines with average memory device wear levels that are within a specified amount of wear deviation.

3. The computer-implemented method of claim 2, further comprising:
   analyzing the average wear level of the one or more memory devices installed in the selected host machine after processing the information for the request; and
   moving the selected host machine to a different host group when the average wear level of the one or more memory devices installed in the selected host machine falls outside the specified amount of wear deviation for a current host group of the selected host machine.

4. The computer-implemented method of claim 1, further comprising:
   analyzing the processing of the workload on the selected host machine; and moving a remaining portion of the processing of the workload to a different host machine if an amount of capacity needed to process the workload exceeds an expected amount of capacity needed to process the request.

5. A system, comprising:

at least one processor; and memory including instructions that, when executed by the at least one processor, causes the system to:

obtain a workload to be processed using a selected resource of a set of resources;

determine an expected amount of wear resulting from processing the workload based at least in part upon information for one or more similar workloads previously processed using the set of resources, wherein the wear corresponds to a reduction of available read-write cycles in at least a portion of the set of resources;

determine a wear level of each of the at least a portion of the set of resources;

balance the wear levels of each of the at least a portion of the set of resources, the balancing based at least in part upon the relative wear of the selected resource and the expected amount of wear associated with processing the workload;

select a resource from the set of resources based at least in part on the balance of the wear levels and resource data received from the set of resources;

transmit information to process the workload in a request to the selected resource;

analyze the processing of the workload;

determine that the actual wear resulting from the processing of the workload exceeds the expected amount of wear by at least a determined threshold amount; and move at least a portion of the workload to a second resource of the set of resources based at least in part upon the determination that the actual wear resulting from the processing of the workload exceeds the expected amount of wear by at least the determined threshold amount, wherein the second resource is selected based at least in part on the balancing and factors associated with the portion of the workload.

6. The system of claim 5, wherein the instructions when executed further cause the system to:

analyze the set of resources to attempt to locate a resource with the least amount or highest amount of wear to select as the selected resource.

7. The system of claim 5, wherein the instructions when executed further cause the system to:

group subsets of the resources by relative amounts of wear, wherein determining the selected resource includes determining a selected subset of the resources and analyzing the relative wear of the resources in the selected subset; and place subsequent workloads on resources in order to reduce a number of the group subsets.

8. The system of claim 5, wherein the resource data comprises a temporal factor associated with a workload to the resource, a number of concurrent connections to the resource, a number of workloads being currently processed by each resource, or an age of each resource.

9. The system of claim 5, wherein the instructions when executed further cause the system to:

normalize wear data received from the set of resources, the set of resources capable of including resources of different types that report different types of wear data.

10. The system of claim 5, wherein the resources comprise at least one of host machines including one or more memory devices known to wear over time, or one or more memory devices known to wear over time that are installed within a host machine.

11. The system of claim 5, wherein the information for one or more similar workloads includes information for similar workloads submitted by a customer associated with the workload to be processed.

12. The system of claim 11, wherein the instructions when executed further cause the system to:

monitor the processing of the workload using the selected resource or the second resource;

determine that a number of operations required to process the workload exceeds an expected number of operations to process the workload based at least in part on the monitoring; and move a remaining portion of the workload to another resource based at least in part on the determination that the number of operations required to process the workload exceeds the expected number of operations to process the workload.

13. The system of claim 5, wherein the selected resource is determined in order to minimize the variation in wear across the set of resources or accelerate the wear of an identified resource.

14. The system of claim 5, wherein the set of resources includes at least one of solid state drives, flash memory devices, or NAND devices having a finite number of read-write cycles.

15. The system of claim 5, wherein the instructions when executed further cause the system to:

generate an alarm when a resource or a subset of the resources approaches zero remaining lifetime.

16. The system of claim 5, wherein the instructions when executed further cause the system to:

generate an alarm when a variation in wear level across the resources exceeds an allowable amount of variation.

17. A non-transitory computer-readable storage medium including instructions that, when executed by at least one processor of a computer system, cause the computer system to:

determine historical information for a user associated with a workload to be processed;

determine an expected amount of wear associated with processing the workload based at least in part upon the historical information for the user, wherein the wear is associated with a reduction of available read-write cycles in a memory resource;

determine a wear level of each of at least a portion of a set of memory resources;

balance an average wear level across at least the portion of the set of memory resources based at least in part upon the wear level of each of at least the portion of the set of memory resources and the expected amount of wear associated with processing the workload;

determine a selected memory resource from the set of memory resources based at least in part on the balance of the wear level and one or more factors associated with the set of memory resources;

transmit information to process the workload in a request to the selected memory resource;

analyze the processing of the workload;

determine that the actual wear resulting from the processing of the workload exceeds the expected amount of wear by at least a determined threshold amount; and move at least a portion of the workload to a second memory resource of the set of memory resources based at least in part upon the determination that the actual wear resulting from the processing of the workload exceeds the expected amount of wear by at least the determined threshold amount, wherein the second memory resource is selected based at least in part on the balancing and factors associated with the portion of the workload.

18. The non-transitory computer-readable storage medium of claim 17, wherein the instructions when executed further cause the computer system to:
normalize wear data received from the set of resources, the set of resources including resources of different types that report different types of wear data.

19. The non-transitory computer-readable storage medium of claim 17, wherein the resources comprise at least one of host machines including one or more memory devices known to wear over time, or one or more memory devices known to wear over time that are installed within a host machine.

20. The non-transitory computer-readable storage medium of claim 17, wherein the instructions when executed further cause the computer system to:
analyze the set of resources to attempt to locate a resource with the least amount or highest amount of wear to select as the selected resource.

21. The non-transitory computer-readable storage medium of claim 17, wherein the instructions when executed further cause the computer system to:
group subsets of the resources by relative amounts of wear, wherein determining the selected resource includes determining a selected subset of the resources and analyzing the relative wear of the resources in the selected subset.

22. The non-transitory computer-readable storage medium of claim 21, wherein the instructions when executed further cause the computer system to:
attempt to place subsequent workloads to reduce a number of the group subsets.

23. The non-transitory computer-readable storage medium of claim 17, wherein the instructions when executed further cause the computer system to:
monitor the processing of the workload using the selected memory resource or the second memory resource;
determine that a number of operations required to process the workload exceeds an expected number of operations to process the workload based at least in part on the monitoring; and
move a remaining portion of the workload to another memory resource based at least in part on the determination that the number of operations required to process the workload exceeds the expected number of operations to process the workload.

24. The non-transitory computer-readable storage medium of claim 17, wherein the set of resources includes at least one of solid state drives, flash memory devices, or NAND devices having a finite number of read-write cycles.

25. The non-transitory computer-readable storage medium of claim 17, wherein the one or more factors comprises a temporal factor associated with a workload to the memory resource, a number of concurrent connections to the memory resource, or a number of workloads being currently processed by each memory resource.

* * * * *